(12) United States Patent
Larzul et al.

(10) Patent No.: US 9,072,406 B2
(45) Date of Patent: Jul. 7, 2015

(54) BEVERAGE DISPENSER WITH HYGIENIC CLEANING CYCLE

(75) Inventors: David Larzul, Meyzieu (FR); Lionel Peretti, Bron (FR); Blaise Rithener, La Tour-de-Peilz (CH)

(73) Assignee: Nestec S.A., Vevey (CH)

( * ) Notice: Subject to any disclaimer, the term of this patent is extended or adjusted under 35 U.S.C. 154(b) by 48 days.

(21) Appl. No.: 13/576,856

(22) PCT Filed: Feb. 2, 2011

(86) PCT No.: PCT/EP2011/051453
§ 371 (c)(1),
(2), (4) Date: Aug. 2, 2012

(87) PCT Pub. No.: WO2011/095509
PCT Pub. Date: Aug. 11, 2011

(65) Prior Publication Data
US 2012/0305597 A1    Dec. 6, 2012

(30) Foreign Application Priority Data
Feb. 3, 2010   (EP) ..................................... 10152557

(51) Int. Cl.
| | |
|---|---|
| *B67D 1/08* | (2006.01) |
| *A47J 31/44* | (2006.01) |
| *A47J 31/46* | (2006.01) |
| *A47J 31/60* | (2006.01) |

(52) U.S. Cl.
CPC .............. *A47J 31/4485* (2013.01); *A47J 31/46* (2013.01); *A47J 31/60* (2013.01)

(58) Field of Classification Search
CPC ........ A47J 31/46; A47J 31/60; A47J 31/4485
USPC ........ 222/146.2, 146.4, 108, 145.2, 533–537, 222/148
See application file for complete search history.

(56) References Cited

U.S. PATENT DOCUMENTS

| | | | |
|---|---|---|---|
| 4,450,987 A * | 5/1984 | Boettcher et al. ............. | 222/641 |
| 6,240,952 B1 | 6/2001 | Schroeder | |
| 6,769,627 B2 * | 8/2004 | Carhuff et al. ................ | 239/120 |
| 7,707,927 B2 * | 5/2010 | Boussemart et al. ........... | 99/280 |
| 7,735,687 B2 * | 6/2010 | Fukushima et al. .......... | 222/148 |

(Continued)

FOREIGN PATENT DOCUMENTS

| | | |
|---|---|---|
| DE | 19940079 A1 | 3/2001 |
| EP | 1656863 A1 | 5/2006 |

(Continued)

OTHER PUBLICATIONS

International Search Report and Written Opinion issued May 3, 2011 for related Intl. Appln. No. PCT/EP2011/051453.

(Continued)

*Primary Examiner* — Donnell Long
(74) *Attorney, Agent, or Firm* — K&L Gates LLP

(57) ABSTRACT

A flavored-beverage preparation machine (1) comprises: —a fluid circuit having a duct (10) that has an outlet (15) for dispensing a flavored-beverage over a filling area (35) for user-receptacles (40); and —a cleaning arrangement for removing remnant flavored-beverage from the duct by passing a clearing fluid through the duct and out of the duct via the outlet, The cleaning arrangement has: —means (300, 400, 450) for providing a gas under pressure; and —a configuration for passing such a gas as this clearing fluid under pressure through and out of the duct for evacuating remnant flavored-beverage from the duct.

18 Claims, 4 Drawing Sheets

(56) References Cited

U.S. PATENT DOCUMENTS

| | | |
|---|---|---|
| 7,913,614 B2 | 3/2011 | Fukushima et al. |
| 8,468,934 B2 * | 6/2013 | Epars et al. .................... 99/295 |
| 2008/0053313 A1 * | 3/2008 | Goltenboth .................... 99/290 |

FOREIGN PATENT DOCUMENTS

| | | |
|---|---|---|
| EP | 1797801 A1 | 6/2007 |
| JP | 2006280727 | 10/2006 |
| JP | 2009543584 | 12/2009 |
| WO | WO 2009122039 A1 * | 10/2009 |

OTHER PUBLICATIONS

Office Action issued in JP Application 2012-551607 mailed Dec. 16, 2014. 7 pages.

* cited by examiner

BEVERAGE DISPENSER WITH HYGIENIC CLEANING CYCLE

CROSS REFERENCE TO RELATED APPLICATIONS

The present application is a National Stage of International Application No. PCT/EP2011/051453, filed on Feb. 2, 2011, which claims priority to European Patent Application No. 10152557.4, filed on Feb. 3, 2010, the entire contents of which are being incorporated herein by reference.

FIELD OF THE INVENTION

The present invention relates to a machine for dispensing a beverage to a user-receptacle, such as a user-cup or a user-mug, via a beverage outlet, having a hygiene safeguarding arrangement. The beverage may in particular be milk-containing, e.g. within the context of coffee and/or chocolate drink preparation.

For instance, the beverage preparation machine combines a coffee brewing unit and a milk heating and/or frothing unit for the preparation café latte, cappuccinos and/or regular coffee with milk.

BACKGROUND ART

Machines for producing beverages, in particular beverages likely to degrade over time, such as milk-containing beverages, e.g. milk-containing coffee, tea or chocolate drinks are well known in the art.

As known in the art, in order to produce such a beverage, water may be passed via a heater for producing steam. The thus generated water steam can be fed to a mixing head in which, e.g. by applying a Venturi effect, milk supplied from a milk supply and air from an air inlet is sucked into the water steam flow which results in a heated water/milk mixture which can then be drained from an outlet nozzle of the mixing head into a cup.

A well known problem is that after having produced the desired amount of beverage, the parts of the machine that have been exposed to the beverage bear residues thereof, in particular milk, that may degrade or be unwantedly mixed with subsequently prepared beverages, in particular milk-free beverages, when the machine is suitable to prepare different types of beverages.

A typical example of such undesirable residue issues is encountered with in-line milk vapour-operated frothing or heating heads. The inlet of the head, the interior of the head itself as well as the outlet nozzle are exposed to milk and thus have to be cleaned to prevent contamination, e.g. by rinsing. In known devices, this is a labour intensive and time consuming work asking for a manual rinsing of the described milk flow path. The rinsing and/or cleaning can actually take substantially more time and effort than the step of producing the mixture. The cleaning is particularly difficult when the milk has dried on the surfaces of the mixing head. On the other hand, if the cleaning is not carried out properly and frequently enough, there can be hygiene-related problems in any subsequent use of the device.

A solution to this problem has been proposed in EP 1 656 863. A movable in-line venturi-based milk frothing head has a self-cleaning configuration in which the milk suction inlet is moved and dipped into a rinsing media and the milk outlet is moved over a collector for the used rinsing media. In this configuration, the rinsing media is driven through the head for cleaning thereof. The milk frothing head can be motorized to carry out the entire cleaning process automatically.

EP 1 374 748 discloses a venturi-type in-line frother which has: a milk inlet connected to a milk container; a water (steam) inlet connected to a water source; and an air inlet. The frother has a three-way valve to divert water or steam from the water source into the air inlet line and therefrom into the emulsification chamber for rinsing thereof. Simultaneously, steam is passed via the steam supply line into the steam inlet. The flushing water passed through the frother is collected in a waste basin. Consequently, milk traces are flushed out of the air and steam lines. The flushing process may be carried out at the end of each beverage preparation or at the user's request or automatically after some delay after a beverage preparation to avoid accidental scalding if a user inserts his or her hand beneath the beverage discharge duct immediately after beverage preparation.

Another approach involves the use of disposable parts that are exposed to the degradable liquid such as milk, for example as taught in EP 1 746 920.

Fluid circuits conveying milk require frequent cleaning. Upon beverage preparation, milk remnants tend to accumulate in the fluid circuit of beverage preparation machines and degrade rapidly therein. Consequently the circuit, in particular the pipes and valves, contains milk waste and is contaminated.

There is still a need to provide a simple and hygienic cleaning arrangement for a beverage preparation machine.

SUMMARY OF THE INVENTION

A preferred object of the invention relates to a beverage preparation machine that has a simple and safe hygienic configuration for self-cleaning.

Another preferred object of the invention is to provide a beverage preparation machine with an arrangement for maintaining a good visual aspect and a satisfying hygienic level.

A further preferred object of the invention is the reduction of the frequency of in-depth cleaning of beverage preparation machines, in particular involving detergents.

Yet another preferred object of the invention is to reduce the amount of beverage wasted in the fluid circuit of a beverage preparation machine.

Therefore, the invention relates to a flavoured-beverage preparation machine, in particular a flavoured-beverage containing at least one of milk, coffee, tea, soup and chocolate. Flavoured-beverage means in particular any liquid fit for human consumption that is naturally or artificially flavoured, in particular milk. In contrast, clear water would normally not be considered as a flavoured-beverage.

The beverage preparation machine comprises: a fluid circuit having a duct that has an outlet for dispensing a flavoured-beverage over a filling area for user-receptacles; and a cleaning arrangement for removing remnant flavoured-beverage from the duct by passing a clearing fluid through the duct and out of the duct via the outlet.

In accordance with the invention, the cleaning arrangement comprises: means for providing a gas under pressure; and a configuration for passing such gas as the clearing fluid under pressure through and out of the duct for evacuating remnant flavoured-beverage from the duct.

Further features and advantages of the invention will appear in the detailed description.

BRIEF DESCRIPTION OF THE DRAWINGS

The invention will now be described with reference to the schematic drawings, wherein.

DETAILED DESCRIPTION

FIGS. 1 to 5 illustrate two beverage preparation machine structures containing a cleaning arrangement according to the invention. The cleaning arrangement as such is explained in greater details in relation with FIGS. 6 to 9.

Figure 1:
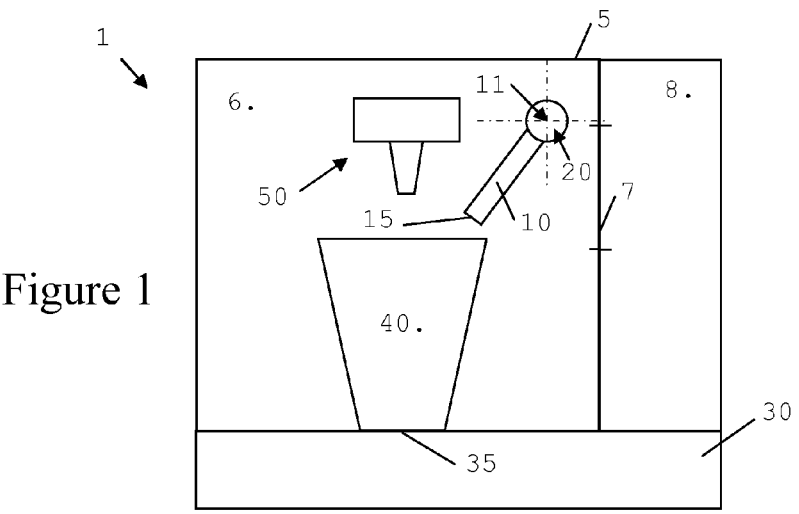
FIGS. 1 to 3 schematically illustrate a first embodiment of a beverage preparation machine according to the invention.
Figure 2:
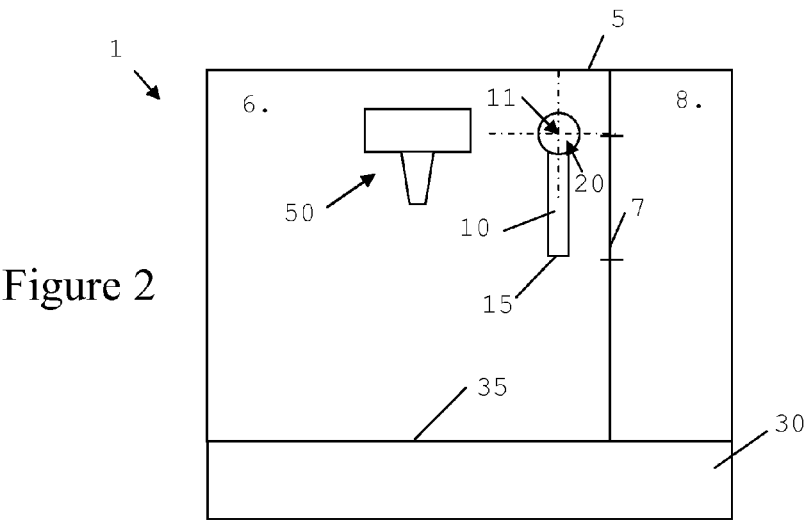
Figure 3:
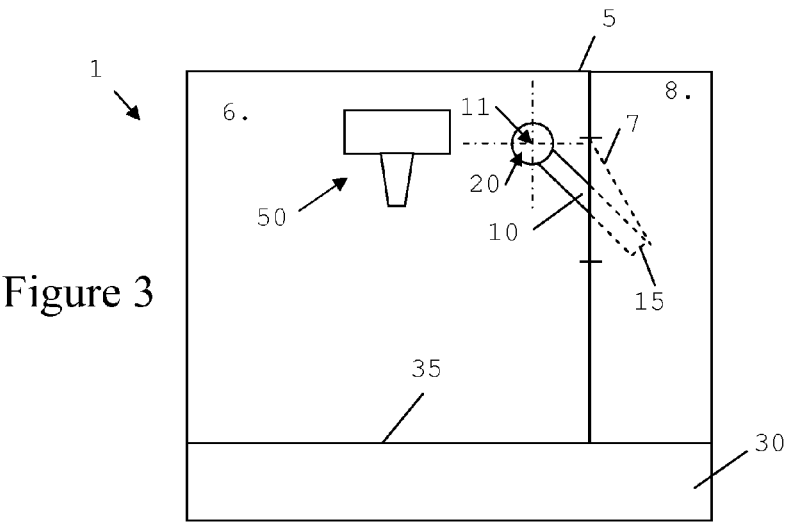

FIGS. 1 to 3 show schematic front views of a beverage preparation machine 1 according to the invention. Machine 1 has a housing 5, a duct 10 that has an outlet 15, a conduit 20 upstream duct 10 and connected thereto and a waste liquid collector in the form of a collection tray 30 arranged to collect waste liquid from outlet 15.

In FIG. 1, duct 10 is shown in an operative position for circulating a beverage through conduit 20, into duct 10 and for dispensing such beverage from outlet 15 outside housing 5 above a user-receptacle 40, e.g. a mug or cup, resting on a receptacle filling area 35 formed by a grid on collector 30. Housing 5 has a front wall 6 delimiting on one side filling area 35 that extends horizontally in front of machine 1.

In FIG. 2, duct 10 is shown in an intermediate position between the operative position shown in FIG. 1 and a cleaning position shown in FIG. 3.

Right before cleaning, outlet 15 is pivoted, typically automatically, into housing 5. In the cleaning position (FIG. 3), duct 10 is arranged to circulate cleaning fluid fed via conduit 20 and evacuate such a cleaning fluid from outlet 15 inside housing 5 to collection tray 30.

Collection tray 30 extends from inside to outside housing 5 so that outlet 15 is situated above tray 30 in the operative position (FIG. 1) as well as in the intermediate position (FIG. 2) as well as in the cleaning position (FIG. 3).

Hence, collector 30 is arranged to collect from outlet 15 waste beverage in the operative and intermediate positions as well as used cleaning fluid in the cleaning and intermediate positions.

Furthermore, housing 5 has an opening, for instance covered with a pivotable gate 7, e.g. a hatch, for allowing the passage of outlet 15 when pivoted into housing 5, as illustrated in FIG. 3, gate 7 may be pivotally mounted so that it can be pushed open by duct 10 pivoting into the cleaning position (FIG. 3). Furthermore, gate 7 may return into its closed configuration (FIGS. 1 and 2) under the effect of gravity when duct 10 is pivoted out from housing 5. Other gate configurations are of course possible, in particular motorised gates that are opened and closed in alignment with the movements of duct 10.

As illustrated in FIGS. 1 to 3, duct 10 is pivotally assembled to conduit 20 for moving outlet 15 from the operative position (FIG. 1) to the cleaning position (FIG. 3) via the intermediate position (FIG. 2). The intermediate position may be a position of inactivity (standby) of duct 10.

In a variation, it is possible to combine the active position and the inactive position. For instance, the duct is in its vertical position to rest or dispense beverage and pivoted into its cleaning position with its outlet moved into the housing for evacuating the cleaning fluid, e.g. by means of an actuator such as an electric actuator. From the cleaning position, the duct can pivot back into the active/inactive position under the effect of gravity upon deactivation of the actuator or by means of an actuator such as an electric actuator.

Duct 10 can be moved by an electric actuator, in particular an electro-mechanic actuator such as an electromagnet or a motor, from the operative position to the cleaning position and/or vice versa. For instance, duct 10 is moved into the operative and the cleaning positions (FIGS. 1 and 3) by activation of an electric actuator and brought back into the intermediate position (FIG. 2) under the effect of gravity when the actuator is deactivated. In a different configuration, it is of course also possible to have the duct brought by gravity into the operative position or into the cleaning position.

Conduit 20 extends from inside housing 5 through front wall 6 of housing 5, generally perpendicularly thereto, out of housing 5. Outside of housing 5, duct 10 is mounted perpendicularly to conduit 20 and is pivotable in a plane generally parallel to front wall 6. Hence, pivoting axis 11 of duct 10 is generally perpendicular to front wall 6. Consequently, outlet 15 is pivoted into a side part 8 of housing 5 bearing gate 7. Side part 8 delimits on the side beverage filling area 35.

Typically, conduit 20 is connected to a unit for preparing a beverage such as tea, coffee, chocolate, soup or milk, in particular cold or hot beverage.

In the embodiment shown in FIGS. 1 to 3, conduit 20 can be connected inside the machine to a milk heating and/or frothing arrangement (not shown). For example, this arrangement includes a mixing head for mixing milk with air and/or steam. Alternatively, the mixing head may be associated with duct 10, duct 10 having for example an air inlet 150 that may be permanently open or intermittently closable for dispensing un-frothed milk or for circulating air-free cleaning liquid. The closing of optional air inlet 150 may be carried out manually or automatically as needed, e.g. via an electro-valve (not shown). Venturi-based mixing heads, as generally known in the art, are for example disclosed in EP 1 656 863 and in EP 1 746 920.

Typically, the cleaning fluid circulated through conduit 20 and duct 10, e.g. via a venturi-based mixing head, is water or water-containing, optionally with a descaling agent or detergent. The cleaning fluid may be air or air-containing. For instance, Machine 1 is arranged to run a cleaning process whereby air and steam and/or water are sequentially supplied through the conduit 20 and evacuated via outlet 15 of duct 10.

A milk processing arrangement for such machine 1 is discussed in greater details in relation with FIGS. 6 to 9.

In the operative position, duct 10 extends outside of housing 5 and is arranged to dispense the beverage from outlet 15. In the cleaning position, duct 10 is arranged to circulate the cleaning fluid through duct 10 still extending outside of housing 5 and evacuate the cleaning fluid via outlet 15 located within housing 5 into waste liquid collector 30. In other words, in the cleaning position, duct 10 extends from outside into housing 5 for evacuating the cleaning liquid in a shielded, confined space separated from the user. Thus the user is safely protected by housing 5 from the evacuated cleaning fluid.

A coffee or tea dispensing head 50 is also shown in FIGS. 1 to 3. Typically, machine 1 is a coffee or tea machine integrating a milk dispensing arrangement.

For instance, machine 1 combines a coffee brewing unit for dispensing coffee via head 50 and a milk heating and/or frothing unit dispensing heated and/or frothed milk via outlet 15, for the preparation café latte, cappuccinos and/or regular coffee with milk within the same machine and optionally automatically, i.e. the combination of milk and coffee being carried automatically by the machine upon a request of a user for such a milk-containing coffee.

Machine 1 can be a coffee or tea preparation machine, such as a self-contained table-top machine that can be electrically connected to the mains, e.g. at home or in an office. In particular, machine 1 is arranged for preparing within an ingredient processing arrangement a beverage by passing hot or cold water or another liquid through a capsule containing an ingredient of the beverage to be prepared, such as ground coffee or tea. A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

For example, machine 1 comprises: an ingredient processing arrangement including one or more of a liquid reservoir, liquid circulation circuit, a heater, a pump and a beverage preparation unit arranged to receive ingredient capsules for extraction and evacuate capsules upon extraction; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550, WO 2009/130099 and WO 2010/015427.

The beverage processing arrangement may include one or more of the following components:
a) a brewing unit for receiving an ingredient of this beverage, in particular a pre-portioned ingredient supplied within a capsule, and for guiding an incoming flow of liquid, such as water, through said ingredient to a beverage outlet;
b) an in-line heater, such as a thermoblock, for heating this flow of liquid to be supplied to the brewing unit;
c) a pump for pumping this liquid through the in-line heater;
d) one or more fluid connecting members for guiding this liquid from a source of liquid, such as a tank of liquid, to the beverage outlet;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the brewing unit, the in-line heater, the pump, a liquid reservoir, an ingredient collector, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151.

Figure 4:
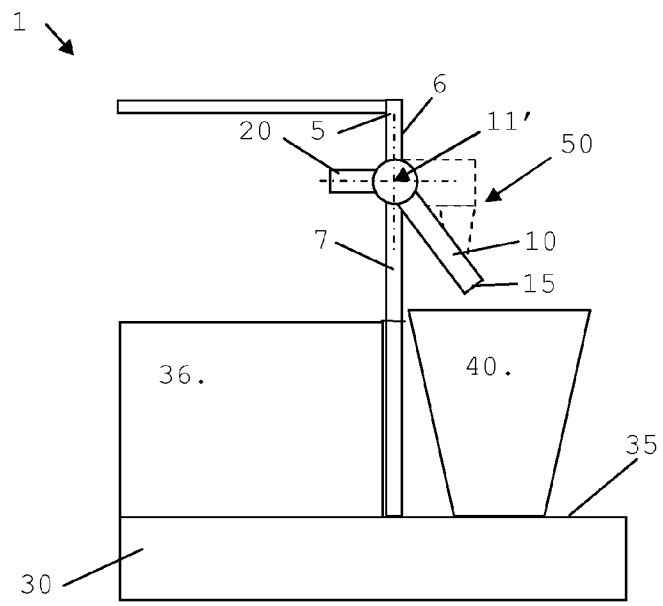
FIGS. 4 and 5 schematically illustrate a second embodiment of a beverage preparation machine according to the invention.
Figure 5:
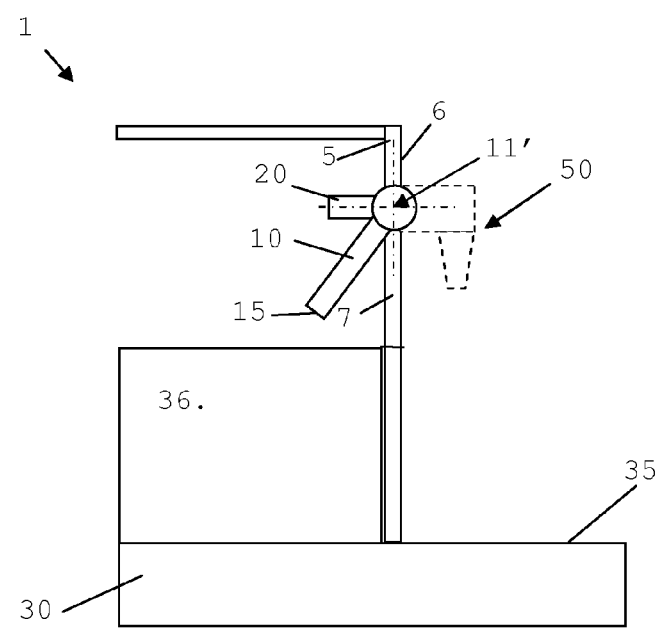

FIGS. 4 and 5, in which the same numeric references designate generally the same or similar components, show a schematic cross-sectional side view of a variation of a beverage preparation machine 1, in accordance with the invention.

Machine 1 has a housing 5 with a front wall 6, a duct 10 that has an outlet 15, a conduit 20 upstream duct 10 and connected thereto, and a waste liquid collector 30 arranged to collect waste liquid from outlet 15. Duct 10 has: an operative position (FIG. 4) for circulating beverage through conduit 20 and dispensing this beverage from outlet 15 outside housing 5 above a user-receptacle filling area 35 into a cup or mug 40; and a cleaning position (FIG. 5) for circulating cleaning fluid through conduit 20 and evacuating this cleaning fluid from outlet 15 inside housing 5 to collector 30.

Duct 10 is pivotally assembled to conduit 20 at a pivoting point 11 for pivoting outlet 15 between the operative position (FIG. 4) and the cleaning position (FIG. 5).

The fluid line formed by conduit 20 and duct 10 extends through front wall 6 of housing 5. Duct 10 is pivotally mounted to conduit 20 at front wall 6 of housing 5 along pivoting axis 11 that extends generally parallelly to wall 6, in contrast to the embodiment shown in the previous Figures. In the embodiment shown in FIGS. 4 and 5, pivoting axis 11 extends within front wall 6.

Moreover, duct 10 is able to pivot in an out of housing 5 via an opening 7 allowing the passage of duct 10. Duct 10 may have an intermediate rest position inbetween the operative and cleaning positions, e.g. at the level of housing 5, in particular of housing wall 6. Duct 10 may be automatically moved from the operative to the cleaning position and vice versa via an actuator, e.g. an electro-magnet.

Front wall 6 delimits user-receptacle filling area 35. Waste liquid collector 30 is provided in the form of a tray that extends from inside housing 5 to outside the housing underneath outlet 15 in its operative position. In particular, collector 30 is arranged to collect waste beverage draining from outlet 15 in the operative position in addition to collecting cleaning liquid evacuated from outlet 15 in its cleaning position. Collector tray 30 supports a receptacle 36 for collecting used beverage ingredient, in particular ground coffee upon brewing, for example contained in pre-portioned capsules. Examples of used-ingredient receptacles 36, liquid collecting trays 30 and user-receptacle supports are disclosed in EP 1 731 065, EP 1 867 260, WO 2009/074559 and WO 2009/135869, the contents of which are hereby incorporated by way of reference.

Typically, conduit 20 is connected to a unit (not shown) for preparing a beverage, such as tea, coffee, chocolate, soup or milk, in particular cold or hot beverage. In particular, the beverage preparation unit includes a milk heating and/or frothing arrangement. For example, the beverage preparation unit comprises a mixing head for mixing milk with air and/or steam, in particular a venturi-based mixing head, that is connected to a milk supply, a steam supply and an air supply.

A milk processing arrangement for such machine 1 is discussed in greater details in relation with FIGS. 6 to 9.

The cleaning fluid is circulated through conduit 20, duct 10 and evacuated via outlet 15 into receptacle 36 from where the fluid drains into collector 30. This fluid can be water or water-containing, optionally with a descaling agent or a detergent, and/or air or air-containing. In particular, machine 1 has a control unit (not shown) connected to the fluid circuit that includes duct 10 and conduit 20, in particular the fluid circuit comprises a pump connected to a source of cleaning fluid, and arranged to run a cleaning process whereby air and steam and/or water are sequentially supplied through the conduit and evacuated via the outlet of the duct.

By evacuating the cleaning fluid via outlet 15 within housing 5, i.e. in a shielded or confined space, the user is protected against projections of cleaning fluid during a cleaning cycle, in particular protected steam and hot water that could spurt from outlet 15 and burn the user.

Moreover, if the cleaning process is programmed to be carried out automatically at specific periods of time, the outlet 15 is moved into housing 5 before evacuation of the cleaning fluid. Hence, there is no risk of evacuation of cleaning fluid to a user-receptacle 40 that would have been put onto receptacle filling area 35 just when machine 1 is about to start the automatic cleaning process. It follows that under these circumstances, the risk of inadvertently filling a user receptacle 40 with evacuated cleaning liquid instead of beverage is excluded.

As will be explained in relation with FIGS. 6 to 9, the cleaning arrangement of machine 1 may also be configured for light clearing process of duct 10 at the end of each beverage preparation cycle into a user-receptacle 40. For such a clearing process, it is not necessary to hide outlet 15 of duct 10 from the user. Hence, outlet 15 may not need to be moved away from above user-receptacle 40.

Generally speaking, a simple structure is provided for safely cleaning, in particular rinsing, the beverage fluid circulation arrangement, in particular the downstream part thereof up to and including the beverage dispensing outlet. Indeed, only the extremity of the downstream part of the circulation arrangement needs to be movable to carry out the evacuation of the cleaning fluid in a shielded, in particular confined area, to prevent exposure of a user.

The housing within which the outlet evacuates the cleaning fluid, may contain the main parts of the beverage preparation machine, including such parts like a pump, heater, cooler, control unit, mixing unit, brewing unit, etc. . . . or may be a dedicated housing for forming a separate confinement or shielding area for the evacuation of cleaning fluid via the duct's outlet.

The cleaning arrangement of a beverage preparation machine, in particular of above machines 1, will now be described in greater details in relation with FIGS. 6 to 9, in which the same references designate the same elements.

FIGS. 6 to 9 illustrate the fluid circuit connected to duct 10 and outlet 15. The fluid circuit connected to dispensing head 50 is not shown in these Figures.

The fluid circuit shown in FIGS. 6 to 9 include a milk tank 100, in particular a refrigerated milk tank, for example a tank as disclosed in WO 2010/009975. Tank 100 is connected to a multi-way valve 400 via an inlet of the valve. The outlet of valve 400 is connected via conduit 20 to duct 10. Furthermore, valve 400 typically has an air inlet 450 and an additional inlet for connection to water tank 200 via water line 240.

Air inlet 450 may be combined with air inlet 150 (indicated in dotted lines in FIGS. 6 to 9) in duct 10.

Duct 10 may be associated with a venturi-type arrangement, for example as disclosed in EP 1 746 920, having a first inlet connect to conduit 20 and a second inlet connected to an outlet of steamer 300 via a steam pipe 310. Steamer 300 has an inlet connect to water tank 200 via a pump 350 for pumping water from tank 200 along first water conduit 352, through pump 350 and via second water conduit 353 into steamer 300.

This fluid circuit 10,15,20,100,200,240,300,310,352, 353, 400,450 is associated with a receptacle filling area 35 for receiving a user-receptacle 40 to be filled via outlet 15 and with a waste liquid collector 30. Waste liquid collector 30 is arranged to collect waste liquid draining from filling area 35 and liquid evacuated from outlet 15 during a cleaning cycle as explained below.

Figure 6:
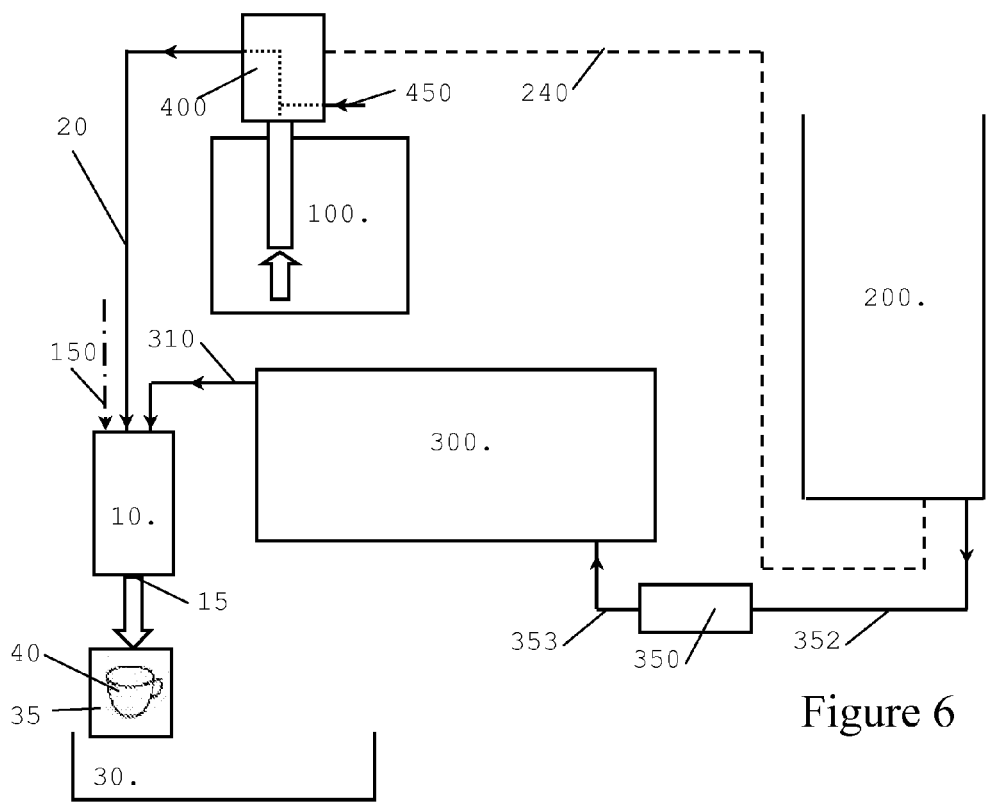
FIGS. 6 to 9 schematically illustrate part of the fluid circuit of the beverage preparation machines shown in FIGS. 1 to 5.

FIG. 6 illustrates a milk frothing configuration of the fluid circuit. Specifically, multi-way valve 400 may have an optional air inlet 450 and its inlet connected to milk tank 100 both opened, whereas its inlet leading to water tank 200 is closed. When present, air inlet 150 can be open. Pump 350 circulates water from tank 200 to steamer 300 via water lines 352,353. Steamer, e.g. an electric resistor steamer, evaporates the fed water and delivers the vapour via conduit 310 into duct 10 containing the venturi device. Passage of vapour via this venturi device sucks milk via multi-way valve 400 and air via inlet 450 and/or inlet 150, which air-milk mixture is then heated and frothed by contact with this vapour and dispensed as milk-froth via outlet 15 into user receptacle 40. To dispense heated liquid without frothing, it is sufficient to close air inlet 450 at multi-way valve 400 and air inlet 150.

Figure 7:
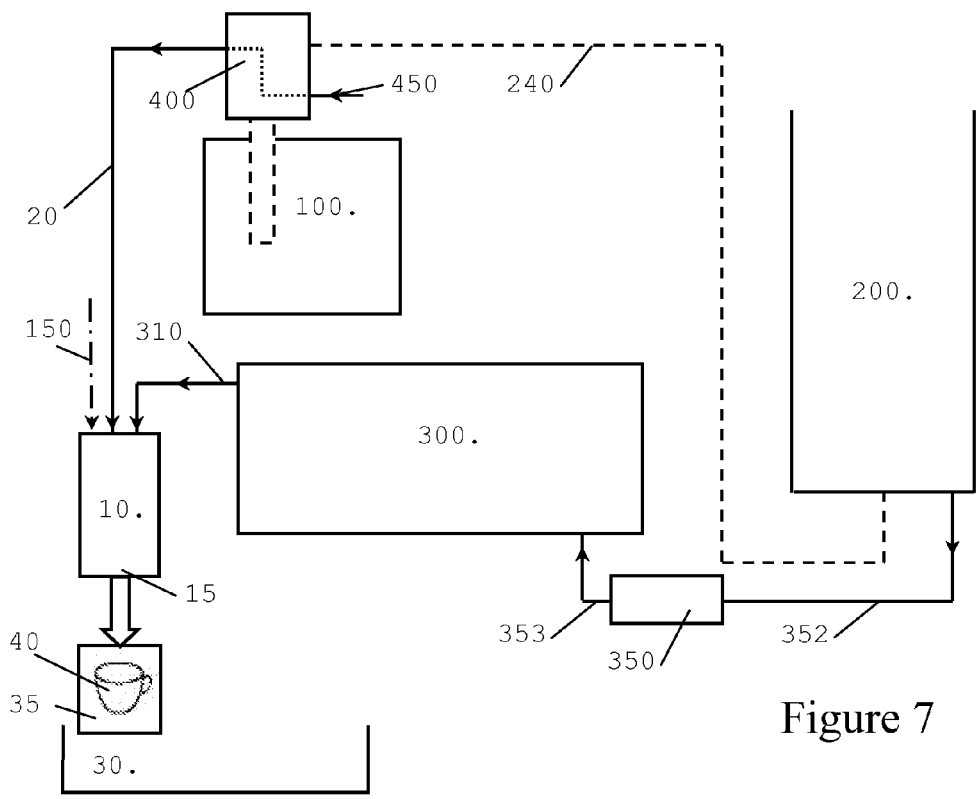

FIG. 7 illustrates the configuration when multi-way valve 400 is arranged to close water line 240 and milk inlet connected to milk tank 100 so that only air inlet 450 remains open and in fluid communication with conduit 20 and duct 10. By circulating water from tank 200 via lines 352,353 and pump 350 into steamer 300 where the water is converted into steam and fed under pressure via line 310 into duct 10, air is sucked into valve 400 along conduit 20, mixes with this steam and escapes via outlet 15 over user receptacle 40.

Figure 8:
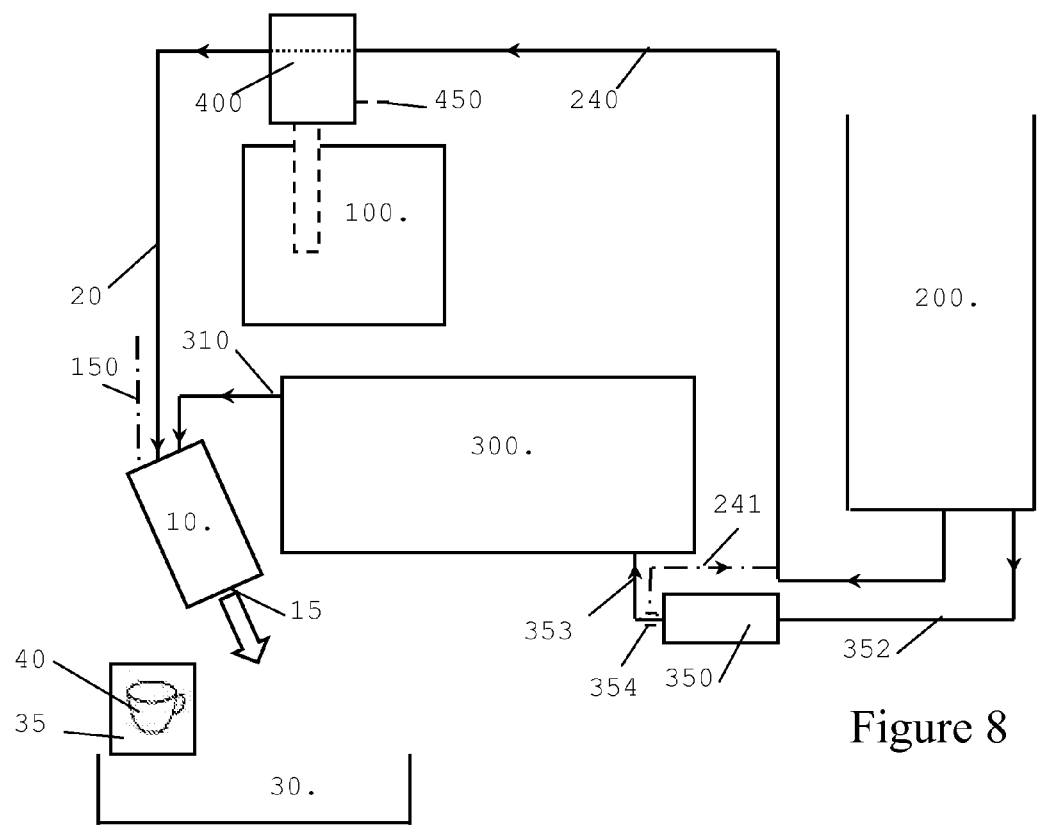

FIG. 8 illustrates the configuration when multi-way valve 400 is arranged to close air inlet 450 and the inlet connected to milk tank 100, the inlet to water line 240 being open to allow circulation of water from tank 200 along line 240 and conduit 20. In this case, steam formed in steamer 300 and supplied via conduit 310 into duct 10 draws water from tank 200 via line 240 through duct 10 which is then heated by exposure to the steam and evacuated via outlet 15. To prevent projections of liquid evacuated via outlet 15, duct 10 is pivoted to confine outlet 15 as explained in relation with FIGS. 1 to 5. In this configuration the liquid evacuated from outlet 15 is not collected in receptacle 40 but is delivered directly into waste liquid collector 30.

To enhance circulation of water along line 240, inlet 241 of line 240 can be connected to an outlet of pump 350 via a valve 354, e.g. a three-way valve 354, instead of being directly connected to water tank 200. Hence, water is driven via line 240 by pump 350 instead of being merely drawn under the effect of steam. Valve 354 may be controlled to adjust the division of water flow between line 353 and line 240. Inlet 241 and valve 354 are indicated in dotted lines in FIG. 8.

Figure 9:
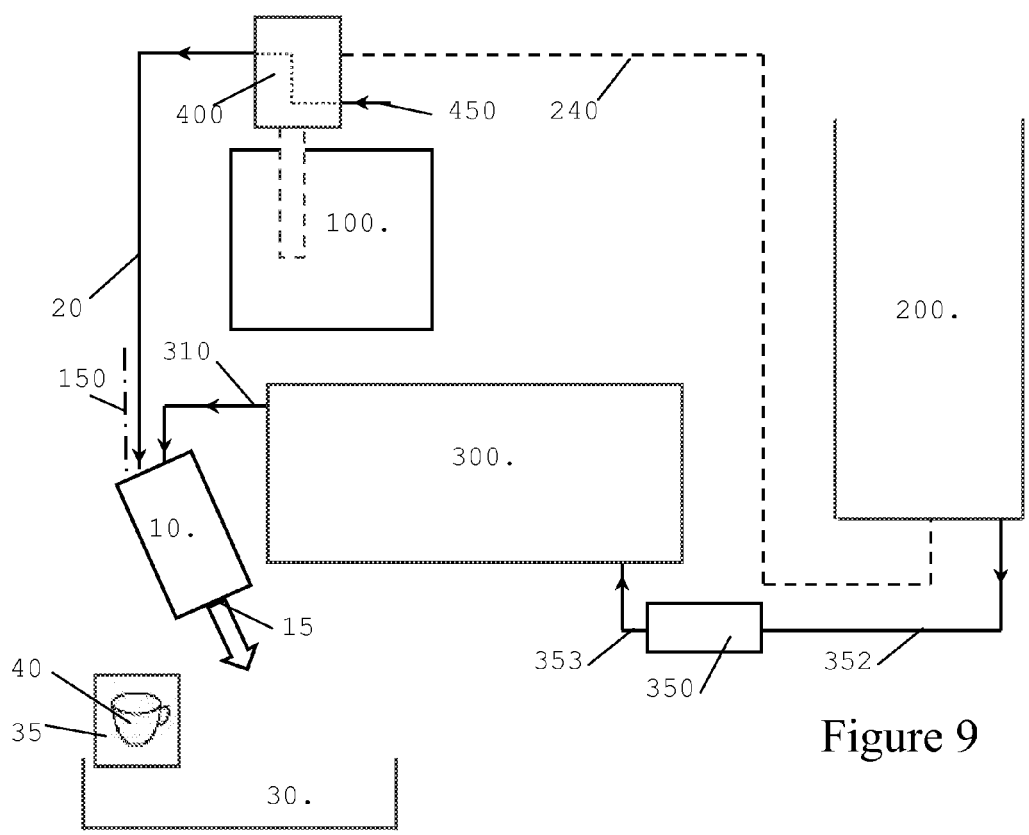

FIG. 9 shows the same fluid circuit configuration as shown in FIG. 7. However, in FIG. 9 duct 10 is pivoted to confine outlet 15 like in FIG. 8. Air inlet 150, when present, may be closed as indicated in FIGS. 8 and 9, or remain opened.

The cleaning arrangement can be used for removing remnant flavoured-beverage from duct 10 by passing a clearing fluid through the duct and out therefrom via its outlet 15.

In accordance with the invention, the cleaning arrangement haa: means 300,400,450 for providing a gas under pressure; and a configuration for passing such gas as the clearing fluid under pressure through and out of duct 10 for evacuating remnant flavoured-beverage from the duct.

The cleaning arrangement includes water steamer 300 for supplying steam under pressure via steam duct 310 into duct 10. The cleaning arrangement is also connected to an air inlet 450 for mixing the steam from steamer 300 with air. Duct 10 incorporates a venturi arrangement for sucking air via inlet 450 by the passage of steam. For instance, duct 10 includes a disposable milk frothing arrangement of the type EP 1 746 920, the content of which is integrated by way of reference.

In a variation, it is possible to use a pressurised air feeder, such as an air pump or compressed air tank to form the cleaning fluid passed through the duct. The pressurised air feeder may be associated to a steam feeder to combine steam with the air to form the cleaning fluid, or the air feeder may be used on its own so that the cleaning fluid is essentially made of air. It is of course possible to use another gas, such as $CO_2$, instead of air.

In one embodiment of the invention, the cleaning arrangement 300,400,450 is configured as shown in FIG. 7 to pass the pressure gas, e.g. steam and air, through and out of duct 10 at an end of a flavoured-beverage dispensing cycle into a user-receptacle 40 for evacuating remnant flavoured-beverage, e.g. hot and/or frothed milk, to user-receptacle 40.

Hence, air and/or another gas is/are sent through the system for emptying the system from the remaining trapped flavoured-beverage, e.g. milk, directly into the user-receptacle at the end of a beverage preparation cycle. This clearing process of the system right at the end of a beverage preparation and dispensing cycle prevents on the one hand dripping of residual flavoured-beverage from outlet 15 upon removal of receptacle 40 and on the other hand accumulation of such drips into waste liquid collector 30. It follows that the frequency of emptying collector 30 is reduced and the machine is maintained in a more hygienic state by avoiding undesirable dripping of flavoured-beverage.

Cleaning arrangement 300,400,450 can be configured to pass the pressure gas through and out of duct 10 immediately after a flavoured-beverage dispensing cycle into user-receptacle 40 or after a delay in the range of 0.05 to 3 sec, such as 0.5 to 1.5 sec, after a flavoured-beverage dispensing cycle. As mentioned above, the idea is to clear the flavoured-beverage from the system straight into user-receptacle 40. Hence, the clearing process should be carried out before the user is expected to remove receptacle 40 from under outlet 15.

In another embodiment, cleaning arrangement 300,400, 450 can be configured to pass a first clearing fluid followed by a different second clearing fluid through and out of the duct 10 for evacuating remnant flavoured-beverage from duct 10. At least one of these first and second clearing fluids forms the said gas under pressure. The cleaning arrangement 300,400, 450 may be configured to pass through and out of the duct 10 for evacuating remnant flavoured-beverage from the duct: gas as a first clearing fluid under pressure (FIG. 9), in particular for 0.5 to 5 sec such as 1 to 3 sec; followed by a clearing liquid (FIG. 8), such as clear water optionally with a detergent, as a second clearing fluid, in particular for 2 to 15 sec such as 3 to 10 sec. It also possible to pass the liquid clearing fluid first (FIG. 8) and pass the gaseous clearing fluid (FIG. 9) after the passage of the clearing liquid. Passing the gaseous clearing fluid (FIG. 9) after the liquid clearing fluid (FIG. 8) is useful to dry the system and prevent dripping of clearing liquid from outlet 15 after the cleaning process has been completed. In such a case, the system is ready for a new beverage preparation and dispensing cycle via the cleaned and dried duct 10. No delay or substantially no delay is required between the passage of two clearing fluids, e.g. between the first and second clearing fluids and/or between the second and third clearing fluids. The passage of one fluid after the other may be immediate or substantially immediate.

The clearing arrangement 300,400,450 may be further configured to pass after the second clearing fluid a third clearing fluid through and out of duct 10, in particular for 0.5 to 5 sec such as 1 to 3 sec. Typically, a first fluid in the form of a clearing gas is passed through the system to evacuate the major leftovers of flavoured-beverage (FIG. 9). Then, a second fluid in the form of a clearing liquid (FIG. 8) is passed through the system to clean the system. Thereafter, a third fluid in the form of a clearing gas (FIG. 9) is passed through the system to dry the system.

The cleaning arrangement 300,400,450 can be configured to pass automatically the first clearing fluid (of said first and second fluids) through duct 10 after a non-dispensing period of time (period of inactivity) in the range of 1 to 60 min, in particular in the range of 2 to 30 min, such as in the range of 3 to 20 min or 5 to 10 min.

As explained in greater details in relation with FIGS. 1 to 5, the beverage preparation machine may include a means, in particular an automatic means such as an electric actuator, for moving duct 10 from a dispensing position (FIGS. 1, 4, 6 and 7) into a cleaning position (FIGS. 3, 5, 8 and 9) in which outlet 15 is located in an area delimited by at least one confinement wall 6 for confining fluids evacuated from outlet 15 away from a user during normal operation.

In an embodiment, the cleaning arrangement is configured to: expel leftovers of flavoured-beverage immediately after a cycle of beverage preparation and dispensing into a receptacle so that the expelled beverage is collected in the receptacle (FIG. 7); and after a non-dispensing period of time to carry out a more thorough cleaning operating, e.g. involving the passage of different clearing fluids, in particular a liquid clearing fluid (FIG. 8), to substantially remove any soiling of the system, and optionally followed by a gaseous clearing fluid (FIG. 9) to dry the system. This more thorough cleaning operation may be carried out with the outlet in a confined area inaccessible to a user during normal operation (FIGS. 3, 5, 8 and 9). Once a day or once every few days, e.g. two or three days, an even more thorough cleaning of the system may be carried out, in particular using a detergent agent, for example with the outlet in the confined area to prevent exposure of the user to cleaning fluids evacuated via the outlet. However, the latter cleaning process can be made at a lower frequency than state of the art systems since the system is maintained relatively clean over time and incrustation of residual flavoured-beverage is largely prevented.

Typically, pressure gas means 300 is further arranged to supply steam for mixing with a supply of another ingredient, such as milk, to prepare said flavoured-beverage (FIG. 6). Cleaning arrangement 300,400,450 can be configured to remove remnant flavoured-beverage from duct 10 by interrupting this supply of another ingredient and maintaining the supply of steam at an end of a beverage dispensing cycle (FIG. 7). Hence, fluid uninterruptedly escapes via outlet 15 between the beverage preparation and dispensing cycle and the process of clearing duct 10 into receptacle 40.

In particular, conduit 20 is in fluid connection with duct 10, conduit 20 being configured to circulate a beverage ingredient, such as milk, to the duct. Cleaning arrangement 300,400, 450 can then be arranged to pass a clearing fluid through conduit 20 and out of the duct via outlet 15 (FIG. 8). This clearing fluid can be a liquid clearing fluid such as water optionally containing a detergent.

As mentioned above, a venturi-device can be arranged in the upstream part of duct 10 for connection thereof to fluid conduit 20 and to means 300 for supplying gas under pressure. Conduit 20 can be connected to a beverage ingredient supply 100, e.g. fresh milk, and a water supply 200, in particular via a three-way valve arrangement or a four-way valve arrangement 400 having an air inlet 450.

Hence, the cleaning arrangement of the invention may be configured to clean all parts of the beverage preparation machine that are exposed to substances, e.g. milk, linked to hygiene issues, in particular by degradation thereof. In the particular embodiment illustrated in FIGS. 6 to 9, these exposed parts include duct 10 exposed to a mixture of milk, vapour with or without air, conduit 20 exposed to milk with or without air, and multi-way valve arrangement 400 exposed to milk. Valve arrangement 400 and conduit 20 can be cleared of any milk residues by the passage of air sucked in via inlet 450 under the effect of circulating steam (FIGS. 6 and 9) and/or by the passage of water from supply 200 via line 240 and valve arrangement 400 into conduit 20 (FIG. 8), as discussed above.

Ingredient supply 100 may be thermally insulated and kept cool, at a temperature in the range of 0 to 10° C., in particular 1 to 5° C., typically within a refrigerating arrangement. Hence, supply 100 much less exposed to ingredient degradation and requires less cleaning. This part of machine 1 may be cleaned once a while, e.g. once every day or once every few days, automatically, semi-automatically or manually.

The invention claimed is:

1. A flavored-beverage preparation machine comprising:
a fluid circuit having a duct that has an outlet for dispensing a flavored-beverage over a filling area for user-receptacles, wherein the duct is pivotally assembled to a conduit to pivot between an operative position and a cleaning position, with an inactive position extending therebetween;
a cleaning arrangement for removing remnant flavored-beverage from the duct by passing a clearing fluid through the duct and out of the duct via the outlet;
the cleaning arrangement comprising:
a member for providing a gas under pressure; and
a configuration for passing the gas as the clearing fluid under pressure through and out of the duct for evacuating remnant flavored-beverage from the duct, the cleaning arrangement being configured to pass, immediately after a flavored-beverage dispensing cycle or after a delay of 0.05 to 3 sec after the flavored-beverage dispensing cycle, the pressure gas through and out of the duct into a user-receptacle for evacuating remnant flavored-beverage to the user-receptacle.

2. The machine of claim 1, wherein the cleaning arrangement comprises a structure selected from the group consisting of:
a water steamer for supplying steam under pressure; and
a pressurised air feeder.

3. The machine of claim 1, wherein the cleaning arrangement is configured to pass the pressure gas through and out of the duct after a delay in the range of 0.5 to 1.5 sec after the flavored-beverage dispensing cycle.

4. The machine of claim 1, wherein the cleaning arrangement is configured to pass a first clearing fluid followed by a second clearing fluid through and out of the duct for evacuating remnant flavored-beverage from the duct, at least one of the first and second clearing fluids being the gas under pressure.

5. The machine of claim 4, wherein the cleaning arrangement is configured to pass through and out of the duct for evacuating remnant flavored-beverage from the duct:
the gas as a first clearing fluid under pressure followed by a clearing liquid or vice versa.

6. The machine of claim 5, wherein the cleaning arrangement is configured to pass after the second clearing fluid a third clearing fluid through and out of the duct.

7. The machine of claim 6, wherein the cleaning arrangement is configured to pass the gas under pressure as the third clearing fluid.

8. The machine of claim 4, wherein the cleaning arrangement is configured to pass the first clearing fluid through the duct after a non-dispensing period of time in the range of 1 to 60 min.

9. The machine of claim 4, comprising an automatic member for moving the duct from a dispensing position into a cleaning position in which the outlet is located in an area defined by at least one confinement wall for confining fluids evacuated from the outlet away from a user during normal operation.

10. The machine of claim 1, wherein the member is arranged to supply steam for mixing with a supply of another ingredient.

11. The machine of claim 1, wherein the cleaning arrangement is configured to remove remnant flavored-beverage from the duct by interrupting the supply of another ingredient and maintaining a supply of steam at an end of the flavored-beverage dispensing cycle.

12. The machine of claim 1, comprising a conduit in fluid connection with the duct, the conduit being configured to circulate a beverage ingredient to the duct, the cleaning arrangement being arranged to pass a clearing fluid through the conduit and out of the duct via the outlet.

13. The machine of claim 1, wherein a venturi-device is arranged upstream from duct for connection thereof to a conduit and the member for supplying gas under pressure.

14. The machine of claim 1, wherein a conduit is connected to a beverage ingredient supply and a water supply.

15. The machine of claim 1, wherein the cleaning position of the duct positions the outlet within a housing of the machine.

16. The machine of claim 15, wherein a collection tray extends from inside to outside the housing so that the outlet is situated above the tray in the operative and cleaning positions of the duct.

17. The machine of claim 15, wherein the housing has an opening through which the outlet passes from pivoting the duct, and the duct is mounted perpendicularly to the conduit and pivotable in a plane generally parallel to the front wall of the housing.

18. A flavored-beverage preparation machine comprising:
a fluid circuit having a duct that has an outlet for dispensing a flavored-beverage over a filling area for user-receptacles, wherein the duct is pivotable around a pivot axis extending through a conduit to pivot between an operative position and a cleaning position, with an inactive position extending therebetween;
a cleaning arrangement for removing remnant flavored-beverage from the duct by passing a clearing fluid through the duct and out of the duct via the outlet;
the cleaning arrangement comprising:
a member for providing a gas under pressure; and
a configuration for passing the gas as the clearing fluid under pressure through and out of the duct for evacuating remnant flavored-beverage from the duct, the cleaning arrangement being configured to pass, immediately after a flavored-beverage dispensing cycle or after a delay of 0.05 to 3 sec after the flavored-beverage dispensing cycle, the pressure gas through and out of the duct into a user-receptacle for evacuating remnant flavored-beverage to the user-receptacle.

* * * * *